(12) United States Patent
Hartlaub et al.

(10) Patent No.: US 7,392,724 B2
(45) Date of Patent: Jul. 1, 2008

(54) STEERING WHEEL WITH AT LEAST ONE DEVICE FOR THE FASTENING OF BUILD-ON PARTS

(75) Inventors: Achim Hartlaub, Großwallstadt (DE); Dietmar Ludwig, Klingenberg (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 10/802,401

(22) Filed: Mar. 17, 2004

(65) Prior Publication Data

US 2004/0216551 A1 Nov. 4, 2004

(30) Foreign Application Priority Data

Mar. 17, 2003 (DE) .............. 203 04 712 U

(51) Int. Cl.
  *B62D 1/04* (2006.01)
  *G05G 1/10* (2006.01)
  *H01H 9/00* (2006.01)
(52) U.S. Cl. ...................... 74/552; 200/61.54
(58) Field of Classification Search ............. 74/552, 74/558.5; 280/731, 728.2, 728.3; 403/8; 200/61.54; *B62D 1/04*
  See application file for complete search history.

(56) References Cited

U.S. PATENT DOCUMENTS

| | | | | |
|---|---|---|---|---|
| 3,977,271 A | * | 8/1976 | Becker ................ | 74/552 |
| 5,794,968 A | * | 8/1998 | Yamamoto et al. ........ | 280/728.2 |
| 6,079,736 A | | 6/2000 | Koide | |
| 6,098,494 A | * | 8/2000 | Kellogg et al. ............ | 74/552 |
| 6,244,620 B1 | * | 6/2001 | Bathon et al. ............ | 280/731 |
| 6,312,012 B1 | * | 11/2001 | Bohn et al. ............... | 280/731 |
| 6,354,622 B1 | * | 3/2002 | Ulbrich et al. ............ | 280/731 |
| 6,418,814 B1 | * | 7/2002 | Emeneth et al. ........... | 74/552 |
| 6,889,436 B2 | * | 5/2005 | Derrick ................... | 29/894.1 |
| 2002/0033321 A1 | | 3/2002 | Miyako et al. | |
| 2002/0034972 A1 | | 3/2002 | Verbeek et al. | |
| 2002/0124682 A1 | * | 9/2002 | Schutz ................... | 74/552 |
| 2003/0024798 A1 | | 2/2003 | Kreuzer | |

FOREIGN PATENT DOCUMENTS

| | | |
|---|---|---|
| DE | 94 21 012 U1 | 4/1995 |
| DE | 199 14 653 C1 | 7/2000 |
| EP | 000945310 A2 * | 9/1999 |
| EP | 1 142 771 A | 10/2001 |
| EP | 1 188 638 A1 | 3/2002 |
| EP | 1 281 597 A2 | 2/2003 |
| JP | 2002093273 A | 3/2002 |

OTHER PUBLICATIONS

Office Action issued in the Japanese counterpart application dated May 1, 2006 (English translation attached).

* cited by examiner

*Primary Examiner*—Vinh T. Luong
(74) *Attorney, Agent, or Firm*—Fitch, Even, Tabin & Flannery

(57) ABSTRACT

A steering wheel is provided with at least one device for the fastening of build-on parts, the steering wheel having a steering wheel skeleton surrounded by foam. A holding part is substantially fixed by the steering wheel foam surround and projects out of the steering wheel foam surround for the fastening of at least one build-on part.

16 Claims, 5 Drawing Sheets

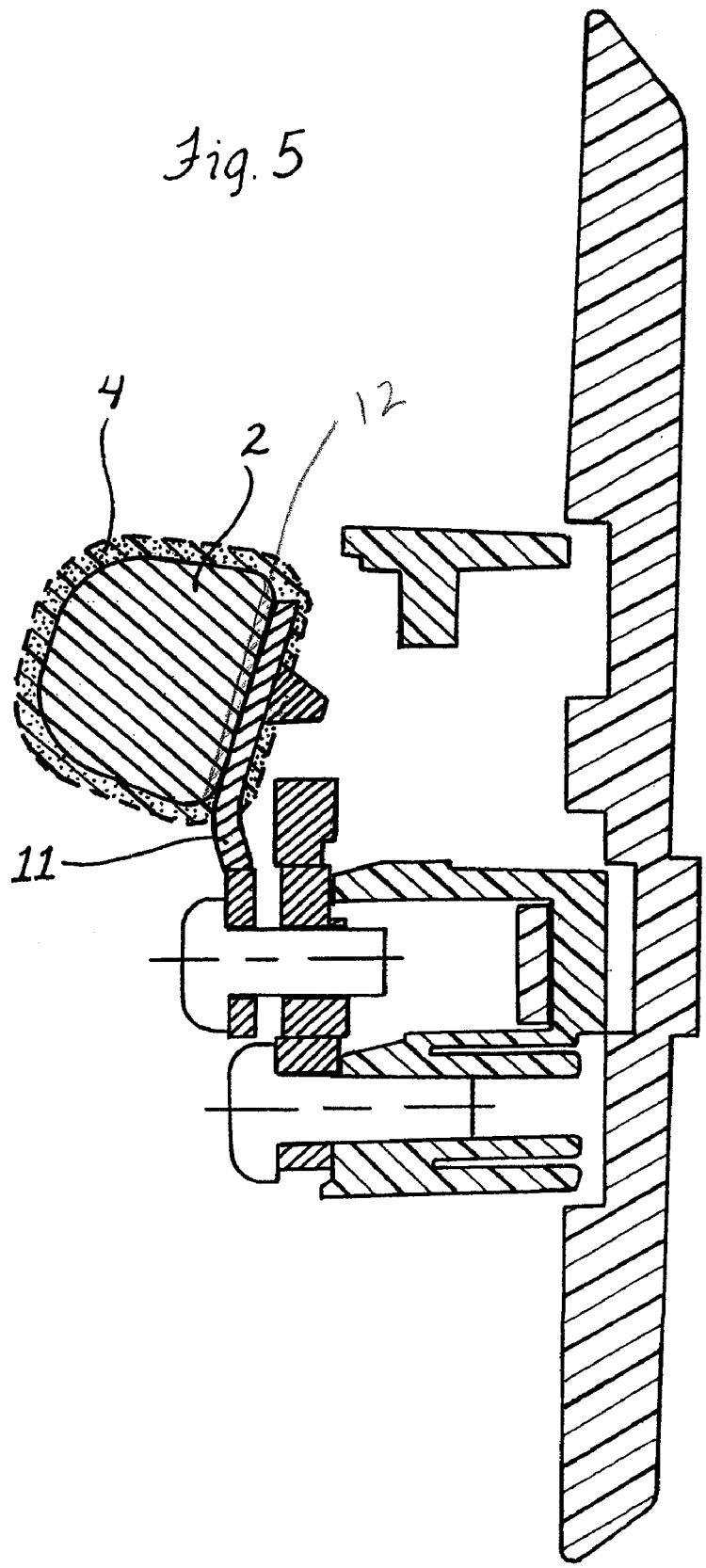

STEERING WHEEL WITH AT LEAST ONE DEVICE FOR THE FASTENING OF BUILD-ON PARTS

INCORPORATION BY REFERENCE

This application claims priority from German Patent Application No. 20304712.5 filed Mar. 17, 2003, which is hereby incorporated by reference.

FIELD OF THE INVENTION

The invention is for a steering wheel with at least one device for the fastening of build-on parts according to the preamble of claim 1.

BACKGROUND OF THE INVENTION

It is known to fasten build-on parts of various types, for example different switches, to steering wheels. In this context, in practice, each vehicle manufacturer has his own ideas regarding the type and mounting location of the build-on parts. Since a steering wheel manufacturer will as far as possible like to satisfy the various requirements by means of existing steering wheel skeleton structures for reasons of cost, he has two possibilities for making these structures practicable.

One possibility is to mount domes, straps and other devices for the fastening of build-on parts to a steering wheel onto the existing skeleton structure at a later stage by means of die changes. The disadvantage of this procedure is that changes are possible only via a 3-D model. The original skeleton die, that is to say the mold for producing the skeleton, has to be dismantled for the change and the mold has to be modified by erosion, for which purpose a new electrode has to be made. Furthermore, it is necessary, after the change has been concluded, once again to carry out a free-testing method. This procedure results, overall, in high additional costs. A further disadvantage is that, as a result of the accumulation of material at the spokes due to domes and straps, the bending strength of the steering wheel skeleton is adversely influenced.

The second possibility is to drill into the steering wheel skeleton, for example in the region of the spokes, in order to screw on build-on parts there. The disadvantage, here, is that the strength characteristics of the aluminum or magnesium skeleton are impaired, above all, during drilling into the spokes. This increases the risk that a spoke fracture will occur in the event of a crash.

SUMMARY OF THE INVENTION

The object on which the invention is based is to mount build-on parts onto a standard steering wheel skeleton, without the strength values of the steering wheel skeleton being modified and without considerable additional costs being incurred.

This is achieved, according to the invention, according to the features of claim 1.

In a steering wheel with at least one device for the fastening of build-on parts, the steering wheel having a steering wheel skeleton surrounded by foam, the device provided according to the invention for the fastening of build-on parts is, on the steering wheel skeleton, a holding part which is fixed by means of a foam surround which projects out of the foam surround for the fastening of at least one build-on part. One advantage of this arrangement is that standard steering wheels can be adapted to customer stipulations without high outlay and without any loss of strength in a steering wheel skeleton, since no structural changes have to be carried out on the steering wheel or there is no need to drill into the steering wheel skeleton. It is necessary merely to make the additional holding part and to position it, together with the steering wheel skeleton, in the steering wheel foaming mold before said steering wheel skeleton is surrounded by foam. As a result, development times and development costs can be saved, in particular also due to additional tests being dispensed with. Even at the start of development, different design variants of a steering wheel are often necessary. Even in this case, fewer dies are required through the use of the invention.

A further advantage is that fixing is possible, irrespective of the material of the steering wheel skeleton, that is to say fixing is possible both to aluminum and to magnesium skeletons.

In one embodiment, there is provision for the holding part to bear against the steering wheel skeleton. It is fixed in this position by the foam surround. In addition, in this embodiment, the holding part may be adhesively bonded to the steering wheel skeleton. As a result, increased durability is achieved and fixing within the foaming mold is also made easier.

In the second embodiment, there is provision for an interspace, which is filled by the steering wheel foam surround, to be present between the steering wheel skeleton and the holding part.

The holding part may be designed differently. Thus, in one embodiment, there is provision for the holding part to surround the steering wheel skeleton at least partially at one point, in each case said holding part may, for example, have a U-shaped or L-shaped design.

Furthermore, however, the holding part may also have a flat design in the region of the steering wheel skeleton. In this case, therefore, the holding part lies against the steering wheel skeleton on only one side, without at least partially surrounding the latter.

The holding part is preferably provided on a spoke of the steering wheel. Furthermore, the holding part is preferably designed as a sheet metal part. A sheet metal part can be produced in the most diverse dimensions and shapes without complicated tools and therefore cost-effectively. However, the holding part provided may also be a plastic part.

To adapt to the most diverse requirements, it is expedient not to fasten the build-on parts directly to the holding part, but to an adaptor, for example an adaptor plate, which is connected as the first build-on part to the holding part. As a result, the holding part can be configured in a simple way, irrespective of the type and size of the build-on parts, and, under some circumstances, can be used for the different customer orders.

The holding part may be connected to the build-on parts by means of screws or rivets. These can be used at this point, since the steering wheel skeleton does not have to be drilled into and therefore the strength of the steering wheel skeleton is not impaired.

In one embodiment, there is provision for that portion of the holding part which lies within the steering wheel foam surround to have a smaller longitudinal extent than the portion which lies outside the steering wheel foam surround. The longitudinal extent refers, in relation to the holding part on the spoke, to the extent in the direction of the spoke longitudinal axis. Other length ratios are, of course, possible according to the different requirements.

BRIEF DESCRIPTION OF THE DRAWINGS

The invention will be explained in exemplary embodiments with reference to drawings in which:

FIG. 5 shows a section through a steering wheel with a third embodiment of the holding part.

DETAILED DESCRIPTION OF THE PREFERRED EMBODIMENTS

Figure 1:
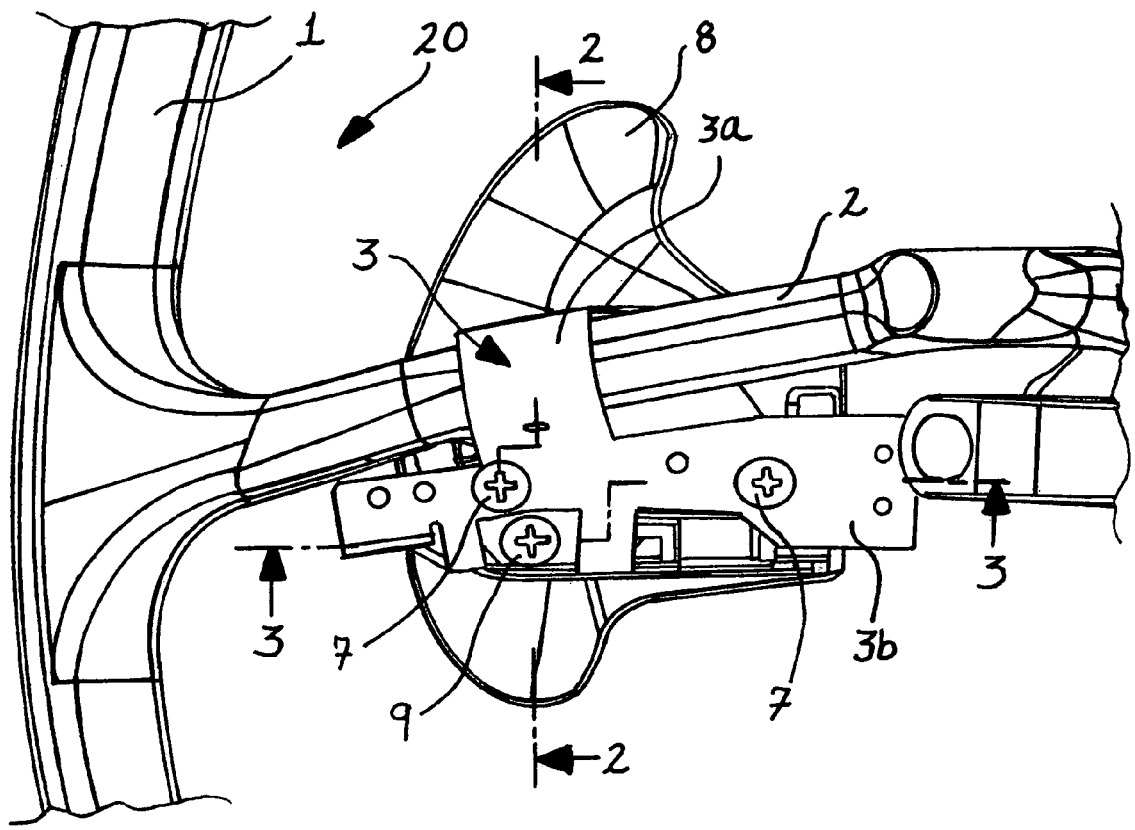
FIG. 1 shows a perspective view of a portion of a steering wheel skeleton.
Figure 2:
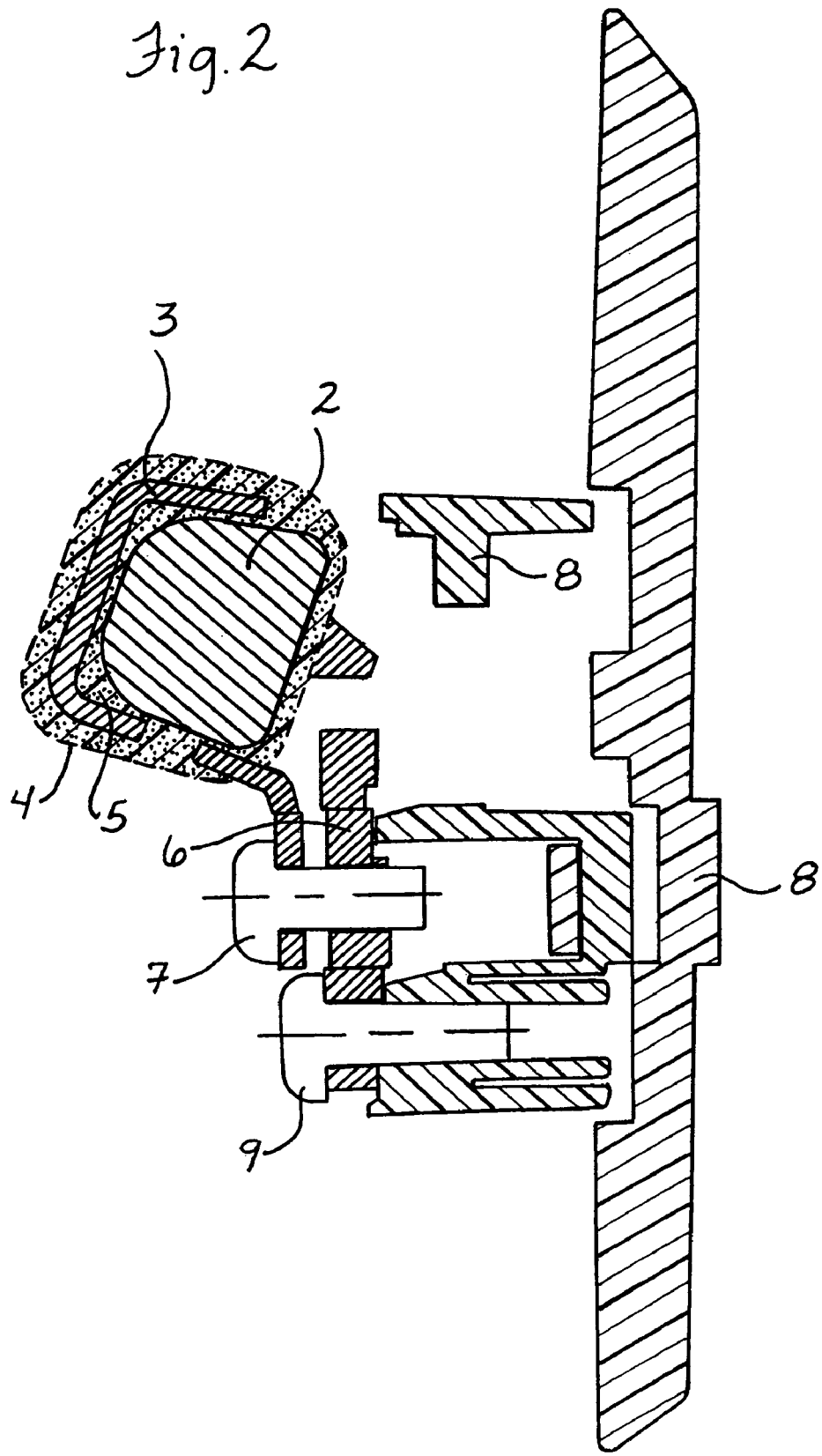
FIG. 2 shows a section through the steering wheel along the sectional line 2-2 of FIG. 1.
Figure 3:
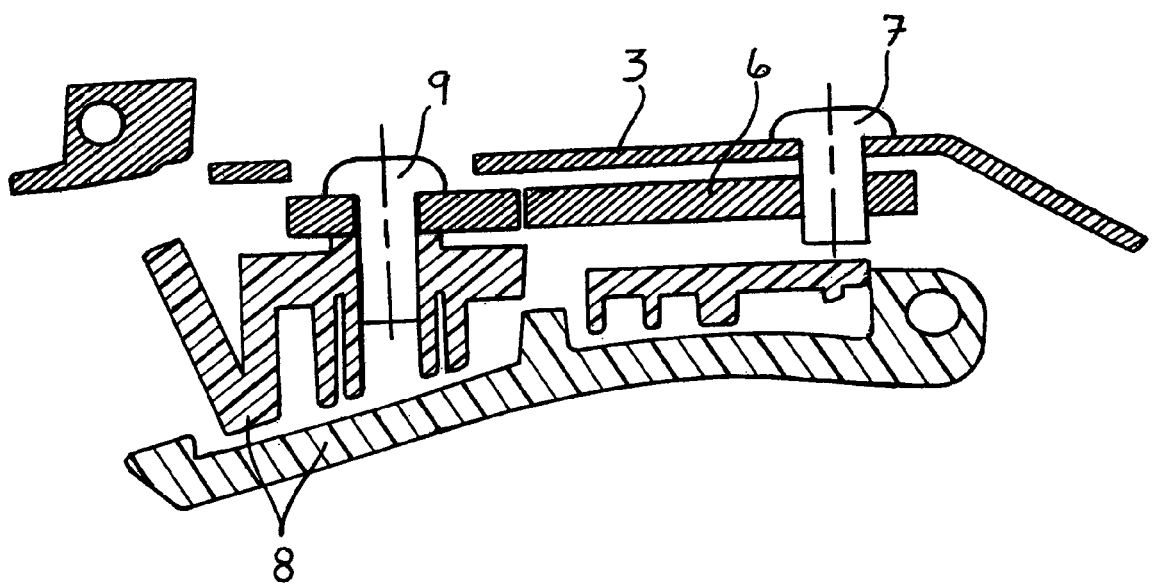
FIG. 3 shows a section through the steering wheel along the sectional line 3-3 of FIG. 1.

FIGS. 1 to 3 illustrate a portion of a steering wheel skeleton with a steering wheel rim 1 and with a spoke 2. A holding part 3 in the form of a holding plate is provided on the latter. As is evident from FIG. 2, the holding part 3 has a U shaped design in the region of the spoke 2, so that it partially surrounds the spoke. As is also evident from FIG. 2, the spoke 2 and the U shaped portion of the holding part 3 lie within a steering wheel foam surround 4, the foam surround also extending into the gap or interspace 5 between the spoke 2 and the holding part 3. The steering wheel foam surround 4 thus holds the holding part 3 securely on the spoke 2, although, apart from the foam surround, there is no mechanical connection between the two. The two parts are fixed in the intended position in the steering wheel foaming mold and are subsequently foamed in. As is evident from FIG. 1, in this embodiment that portion 3a of the holding part 3 which lies within the steering wheel foam surround 4 has a smaller longitudinal extent than the portion 3b which lies outside the steering wheel foam surround 4.

The advantage of this arrangement is that complex build-on parts can be fastened to standard steering wheel skeletons, without the steering wheels having to be modified. Only the holding part is to be adapted in size and shape to that portion of the steering wheel skeleton to which it is to be fastened.

In the present embodiment, an adaptor plate 6 is fastened as a first build-on part to the holding part 3 by means of screws 7. This adaptor plate makes it possible to bring a further build-on part 8 into a position which allows the latter to be mounted by means of a screw 9 past the steering wheel skeleton, without the latter being adversely weakened in terms of strength. In the embodiment illustrated, the build-on part 8 is a paddle switch.

Insofar as simple build-on parts are to be mounted on the steering wheel skeleton, these may be fastened directly to the holding part 3, even without an adaptor, by means of screws or rivets.

Figure 4:
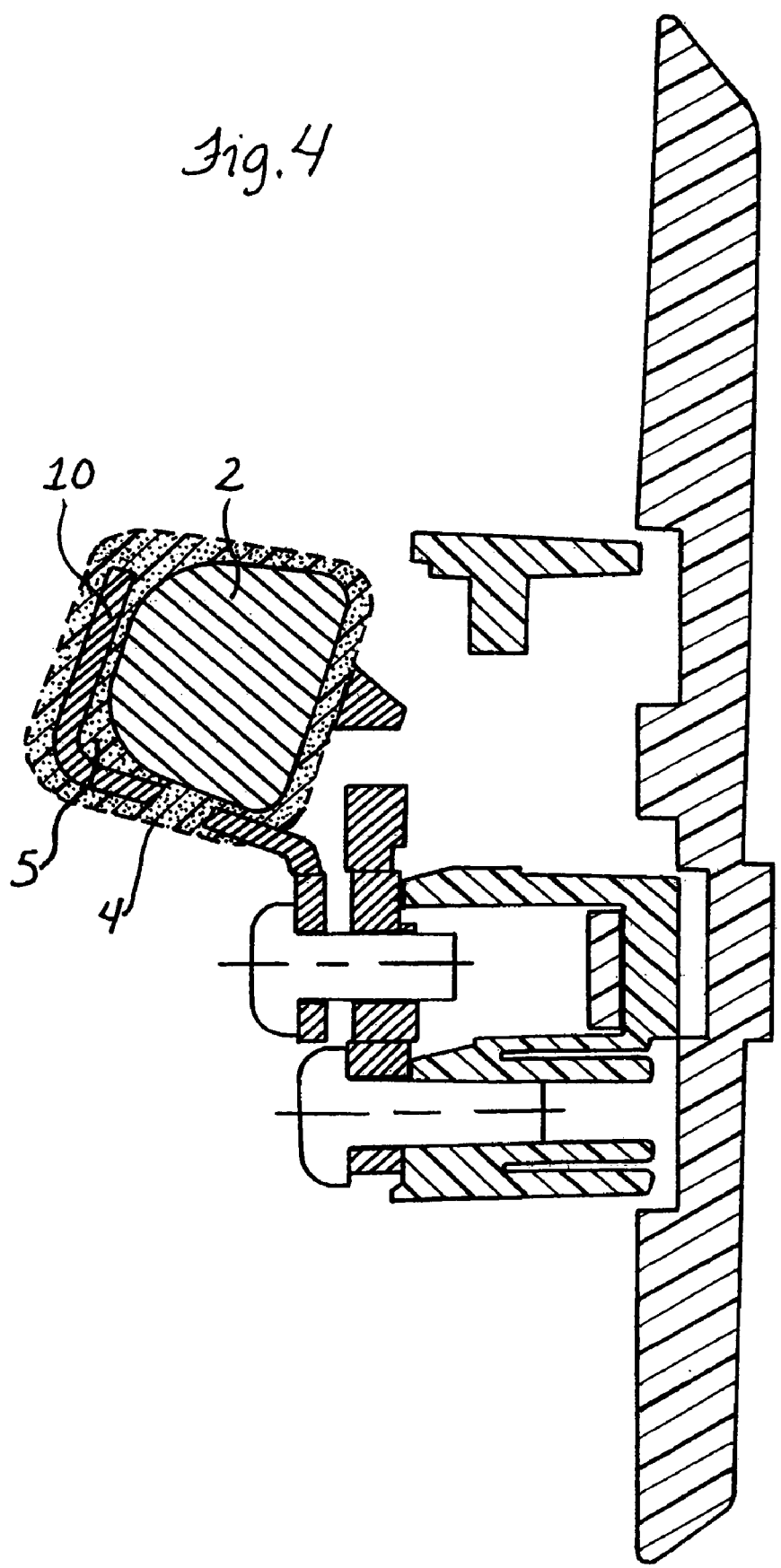
FIG. 4 shows a section through a steering wheel with a second embodiment of the holding part.

The embodiment of FIG. 4 corresponds essentially to that in FIGS. 1 to 3. The difference is in the shape of the holding part. A holding part 10 with an L-shaped cross-section in the region of the spoke 2 is provided. In this embodiment too, the steering wheel foam surround 4 extends into the gap 5 between the spoke 2 and the holding part 10. A holding part in this embodiment is fully sufficient when lightweight build-on parts are to be mounted.

The embodiment of FIG. 5 also corresponds in essential parts to that in FIGS. 1 to 3. Here, too, the difference is in the shape of the holding part. A holding part 11 is provided which has a flat design in the region of the spoke 2. In contrast to the preceding embodiments, this holding part bears closely against the spoke 2 and, as in the previous embodiments, is held by the steering wheel foam surround 4. Where the demands on the holding part are particularly high, in this embodiment the latter may also be adhesively bonded to the spoke before being surrounded by foam. In this case, too, the strength of the spoke is not impaired.

What is claimed is:

1. A steering wheel for mounting of a build-on part thereto, the steering wheel comprising:
    a steering wheel skeleton;
        foam material surrounding the skeleton; and
        a holding part that is fixed relative to the skeleton by the foam material so that a first portion of the holding part is fixed within the foam material against removal therefrom and a second portion of the holding part projects therefrom for mounting of the build-on part thereto,
        wherein an interspace, which is filled by the steering wheel foam material, is present between the steering wheel skeleton and the holding part.

2. The steering wheel as claimed in claim 1, wherein the holding part has an L-shaped design in the region of the steering wheel skeleton.

3. The steering wheel as claimed in claim 1, wherein the holding part has a flat design in the region of the steering wheel skeleton.

4. A steering wheel for mounting of a build-on part thereto, the steering wheel comprising:
    a steering wheel skeleton;
    foam material surrounding the skeleton; and
    a holding part that is fixed relative to the skeleton by the foam material so that a first portion of the holding part is fixed within the foam material against removal therefrom and a second portion of the holding part projects therefrom for mounting of the build-on part thereto,
    the first portion of the holding part surrounds the steering wheel skeleton at least partially at one point, and the holding part first portion has a U-shaped configuration of substantially constant cross-sectional thickness adjacent the steering wheel skeleton.

5. A steering wheel for mounting of a build-on part thereto, the steering wheel comprising:
    a steering wheel skeleton;
    foam material surrounding the skeleton;
    a holding part that is fixed relative to the skeleton by the foam material so that a first portion of the holding part is fixed within the foam material against removal therefrom and a second portion of the holding part projects therefrom for mounting of the build-on part thereto; and
    a generally flat surface of the holding part first portion that engages against the steering wheel skeleton with the remainder of the holding part first portion engaged by the foam material surrounding the steering wheel skeleton to hold the generally flat surface against the steering wheel skeleton.

6. The steering wheel as claimed in claim 5, wherein the holding part is adjacent a spoke of the steering wheel.

7. The steering wheel as claimed in claim 5, wherein the holding part is a sheet metal part.

8. The steering wheel as claimed in claim 5, wherein the holding part is a plastic part.

9. The steering wheel as claimed in claim 5, wherein the build-on part comprises an adaptor, which is connected to the holding part and allows an additional build-on part to be connected thereto.

10. The steering wheel as claimed in claim 9, wherein the adaptor is an adaptor plate.

11. The steering wheel as claimed in claim 5, wherein the holding part is connected to the build-on part by means of screws or rivets.

12. The steering wheel as claimed in claim 5, wherein the first portion of the holding part which lies within the steering wheel foam surround has a smaller longitudinal extent than the portion which lies outside the steering wheel foam surround.

13. The steering wheel of claim 5 wherein the skeleton is free of drilled openings for receiving fasteners for supporting the holding part in substantially fixed relation thereto.

14. The steering wheel of claim 5 wherein the first portion is spaced from the skeleton and embedded in the foam material to be surrounded thereby.

15. The steering wheel of claim 5 wherein the foam material provides the only holding force between the holding part and the steering wheel skeleton.

16. The steering wheel of claim 5 wherein the steering wheel skeleton and the holding part have predetermined substantially fixed positions relative to each other via molding of the foam material to surround the skeleton with the skeleton and the holding part in the predetermined substantially fixed positions.

* * * * *